United States Patent [19]

Lennon

[11] Patent Number: 4,750,754
[45] Date of Patent: Jun. 14, 1988

[54] BICYCLE AND HANDLEBAR SYSTEM

[76] Inventor: Dan C. Lennon, P.O. Box 1177, Hailey, Id. 83333

[21] Appl. No.: 1,616

[22] Filed: Jan. 9, 1987

[51] Int. Cl.[4] ...................... B62K 21/12; B62K 21/26
[52] U.S. Cl. ............................... 280/261; 280/289 H; 74/551.1; 74/551.8; 74/551.9
[58] Field of Search .................. 280/270, 289 H, 263, 280/281 LP; 74/551.1, 551.2, 551.8, 551.9

[56] References Cited

U.S. PATENT DOCUMENTS

| | | | |
|---|---|---|---|
| 581,260 | 4/1897 | Biddle | 74/551.8 |
| 587,626 | 8/1897 | Vollmer | 74/551.9 |
| 602,016 | 4/1898 | Johnson | 74/551.1 |
| 614,774 | 11/1898 | Spiker | 74/551.1 X |
| 717,662 | 1/1903 | Ellison | 74/551.1 |
| 2,059,669 | 11/1936 | Skoog | 74/551.1 |
| 2,929,641 | 3/1960 | Alvistur | 280/261 |
| 3,529,490 | 9/1970 | Pawsat et al. | 74/551.1 |
| 3,884,092 | 5/1975 | Radebaugh | 74/558.5 X |
| 3,937,629 | 2/1976 | Hamasaka | 74/551.8 |
| 3,966,229 | 6/1976 | Foster | 280/261 |
| 4,250,770 | 2/1981 | Robertson | 74/551.8 |

FOREIGN PATENT DOCUMENTS

| | | | |
|---|---|---|---|
| 0035359 | 9/1981 | European Pat. Off. | 280/289 H |
| 479565 | 2/1938 | United Kingdom | 74/551.8 |
| 1159826 | 6/1985 | U.S.S.R. | 280/281 LP |

OTHER PUBLICATIONS

*Bicycle* magazine, vol. 3, No. 8 (Oct. 1986), pp. 46, 80.
*Outside* magazine vol. XI, No. 11 (Nov. 1986), pp. 56–57 et seq.
*Bicycle Guide* magazine (Nov./Dec. 1986), pp. 44–45.

Primary Examiner—John A. Pekar
Attorney, Agent, or Firm—Jenner & Block

[57] ABSTRACT

Novel handlebars for a bicycle are disclosed. The handlebars include a crosspiece connected to a bicycle steering post, and first handles are connected to the crosspiece. Novel second handles extend forwardly from the crosspiece; these second handles are located so that, when they are grasped by a rider, the rider's forearms are located to be supported by the handlebars at positions over the crosspiece. The second handles are located relatively close together to encourage the rider to adopt a riding position in which the frontal area of the rider's silhouette is minimized, and in which the rider's elbows are located ahead of the rider's lungs.

25 Claims, 6 Drawing Sheets

U.S. Patent  Jun. 14, 1988  Sheet 1 of 6  4,750,754
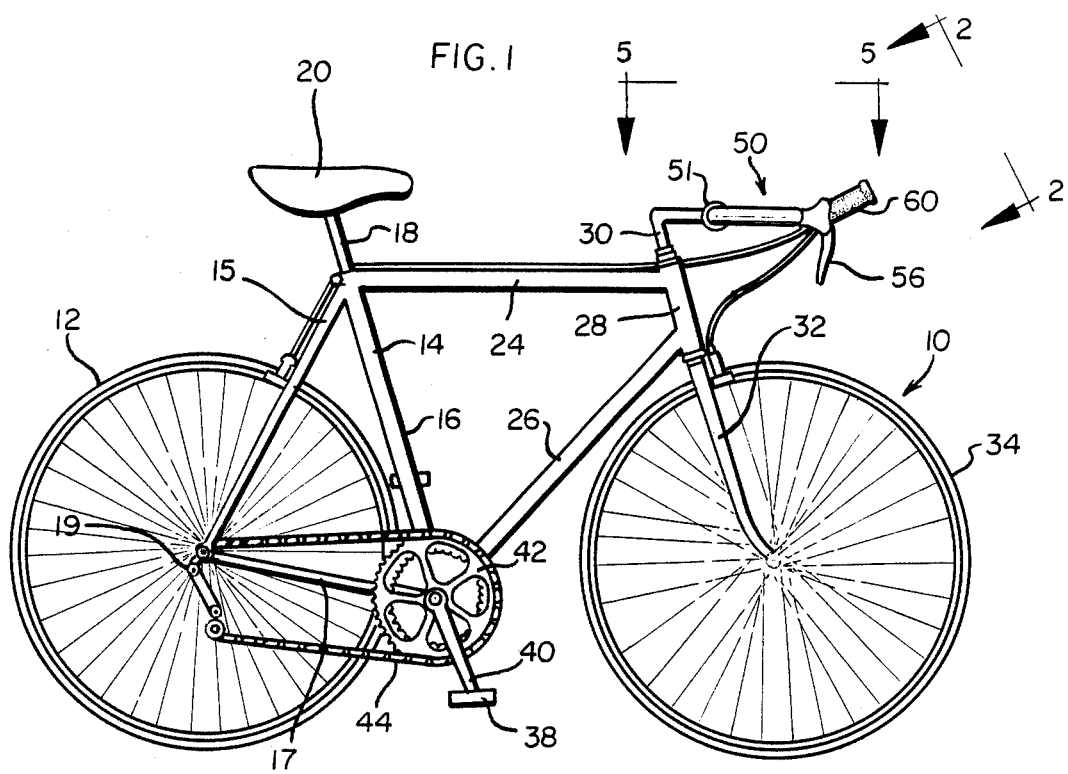
FIG. 1
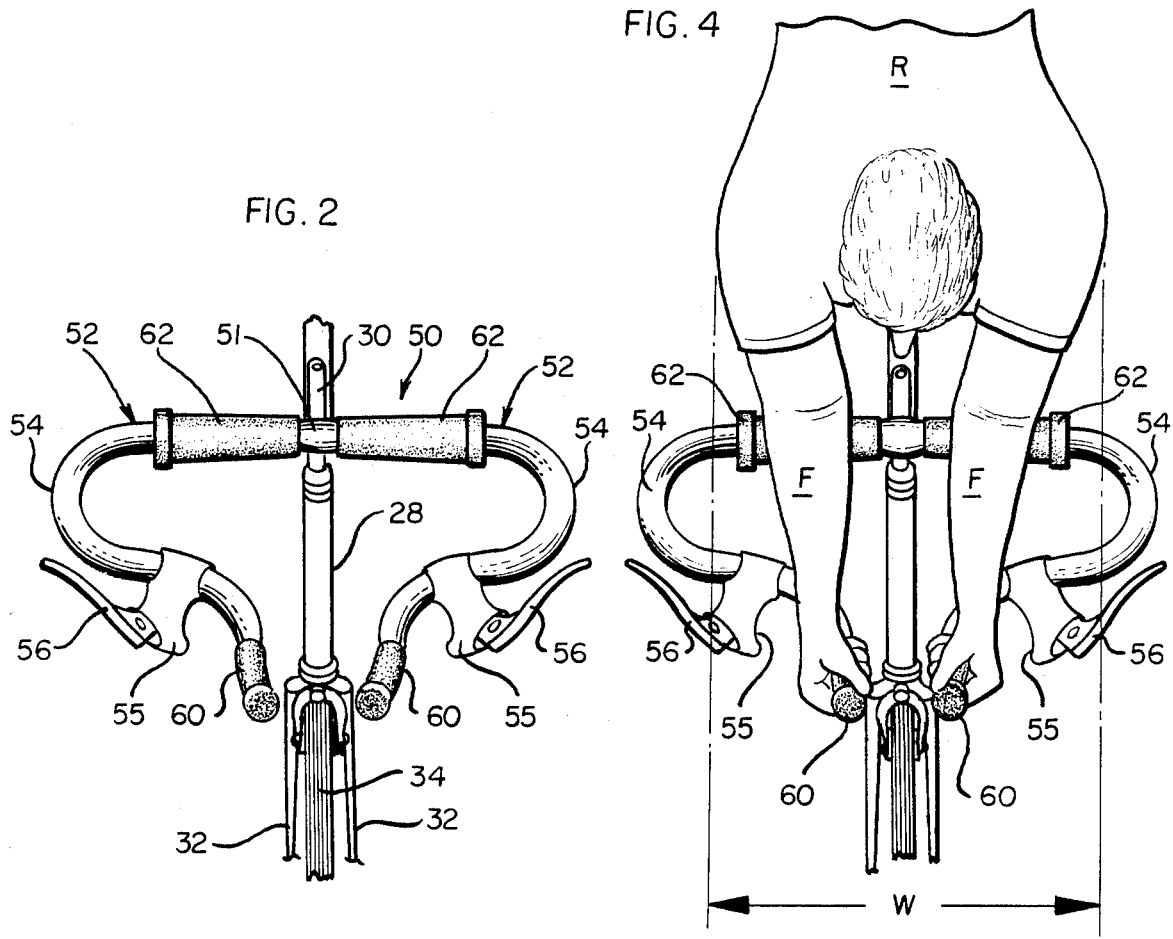
FIG. 2
FIG. 4

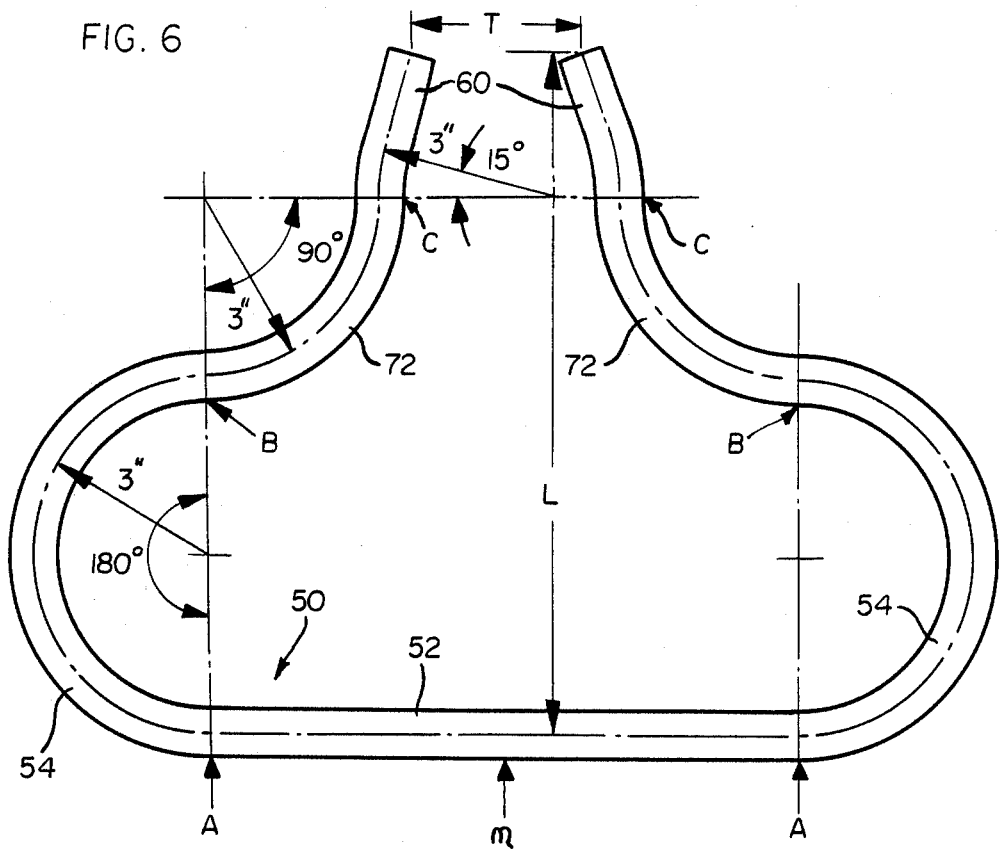
FIG. 6
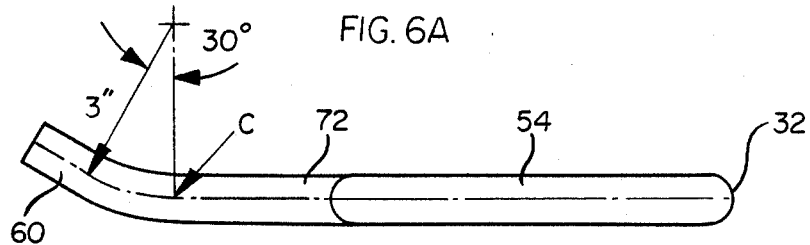
FIG. 6A
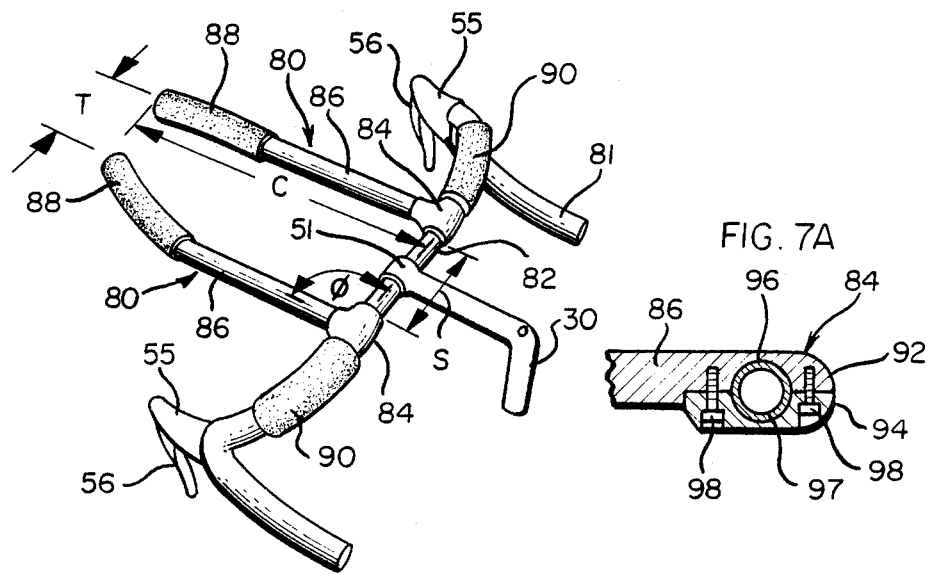
FIG. 7
FIG. 7A

TOP VIEW 7.5"

REAR VIEW 7.5"  30°  VRF

SIDE VIEW

VRS

TOP VIEW 16.25"
7.5"  7.5"

REAR VIEW

35°  VRF

SIDE VIEW

VRS

TOP VIEW 7.5"  ℄  7.5"

REAR VIEW

SIDE VIEW

TOP VIEW

℄
3.25"  3.25"

REAR VIEW

SIDE VIEW

TOP VIEW

℄

REAR VIEW  15°

VRF

SIDE VIEW

45°
23.0"
VRS

BICYCLE AND HANDLEBAR SYSTEM

This invention relates to bicycles and handlebars therefor which are adapted to improve the performance and stamina of the rider.

The design of racing bicycles, or other special-purpose bicycles, is especially complex. Structural changes which may at first seem minor to the unskilled can provide significant improvement in bicycle performance. This improved performance can provide recognizable advantage to the bicycle rider.

To perform well in bicycle race competition—especially a competition of extended duration or length—a minimized frontal area and shape should be presented by the combination of the bicycle and the bicycle rider. Frontal area minimization is not enough, however; the position of the bicycle rider must be comfortable so that the rider can produce requisite high levels of effort and performance for long periods of time.

Frontal areas and rider positions are greatly affected by the position, shape, and arrangement of the bicycle handlebars. Simply as an example, a bicycle having handlebar grips located in a relatively raised position will encourage a rider to assume a relatively upright riding position. While this position may be comfortable, a large frontal area is presented, and the relatively large ensuing wind resistance minimizes top speed even though the rider may be producing a large amount of pedaling effort. Conversely, a bicycle having relatively low-set handlebars encourages the rider to assume a position in which the frontal area is minimized. Small frontal area results in higher top speed with less rider effort. But in prior racing bicycles, the rider is fatigued over time due to the crouched position and is not able to sustain endurance through a long race.

It is an object of the present invention to provide a bicycle and handle bar system located and oriented so as to encourage the bicycle rider to assume an efficient, yet comfortable, riding position which can be sustained over long periods of time.

Another object is to provide handlebars for a bicycle which will encourage the cyclist to assume a comfortable and efficient position on the bicycle when the handlebars are properly mounted on the bicycle.

SUMMARY OF THE INVENTION

In accordance with the present invention, novel bicycle and handlebar systems improve the aerodynamic silhouette and the endurance of the rider. The most desirable modes involve entirely new designs for the handlebars. However, many of the advantages can be obtained by an adapter kit by which a new handlebar system can be attached to an exisiting bicycle.

To accomplish these objects, the novel handlebars include a horizontal crosspiece connected to a bicycle steering post, and first handles connected to the crosspiece. Second handles extend forwardly from the crosspiece. These second handles are located so that, when they are grasped by a rider, the rider's forearms are located to be supported by the handlebars at positions over the crosspiece.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a side elevational view of a bicycle including an embodiment of the novel handlebar system;

FIG. 2 is a developed fragmentary view taken from a position above and forward of the bicycle shown in FIG. 1 as shown by line 2—2 in FIG. 1;

FIG. 4 is a developed fragmentary view taken from a position above and forward of the bicycle and rider as shown by line 4—4 in FIG. 3;

FIG. 6 is a top plane view of the handlebar tubing and illustrates various shapes, configurations and dimensions utilized in the manufacture of the novel handlebars from a stock tube;

FIG. 6A is a side elevational view of the handlebar tubing shown in FIG. 6 and shows in further detail the handlebar tubing shapes, configurations and dimensions utilized in the manufacture of the novel handlebars;

FIG. 7 is a perspective view of an alternate embodiment of the novel handlebars of the present invention;

FIG. 7A is a fragmentary view of an add-on handlebar clamp for the handlebars shown in FIG. 7;

DETAILED DESCRIPTION

Figure 3:
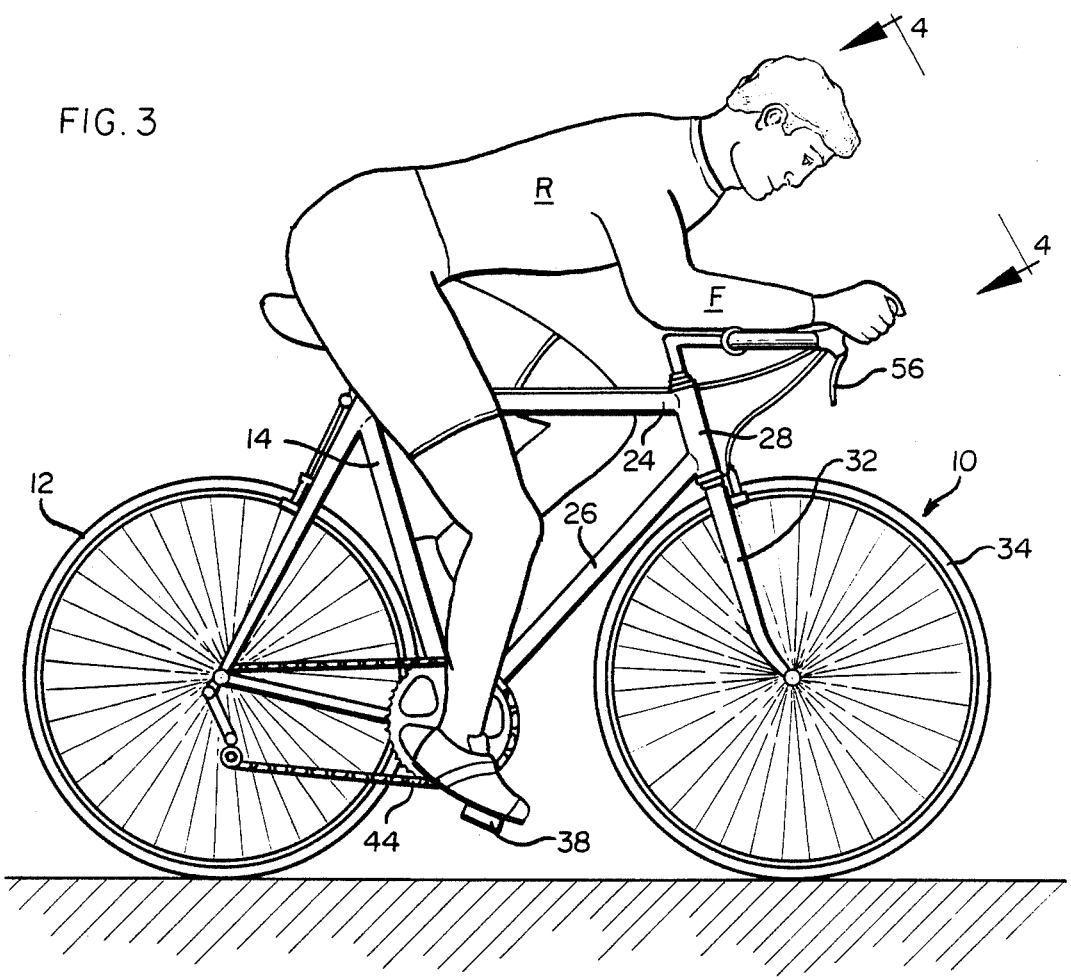
FIG. 3 is a side elevational view similar to FIG. 1 but showing the bicycle and handlebars as they appear when a bicycle rider is aboard the bicycle in a riding position.

While the invention will be described in connection with a preferred embodiment, it will be understood that it is not intended to limit the invention to these embodiments. On the contrary, it is intended to cover all alternatives, modifications or equivalents as may be included within the spirit and scope of the invention as defined by the appended claims.

Turning first to FIGS. 1 and 2, there is shown a bicycle 10 which includes a triangular-shaped frame 14 comprised of a top tube 24, a down tube 26 and a seat tube 16. Seatstays 15 and chainstays 17 join to rigidly secure a rear wheel 12 by its axle 19. Extending from the seat tube 16 is a seat post 18. Mounted atop the seat post 18 is a saddle 20. Seat post 18 may be raised or lowered into the seat tube to accommodate riders of differing heights. The top tube 24 and a down tube 26 extend forwardly to a fork or head tube 28. Journalled within this fork tube 28 is a stem 30 leading to front forks 32. Pedals 38 mounted to cranks 40 operate a drive sprocket 42 and a chain drive 44 in a known manner to propel the bicycle.

Figure 5:
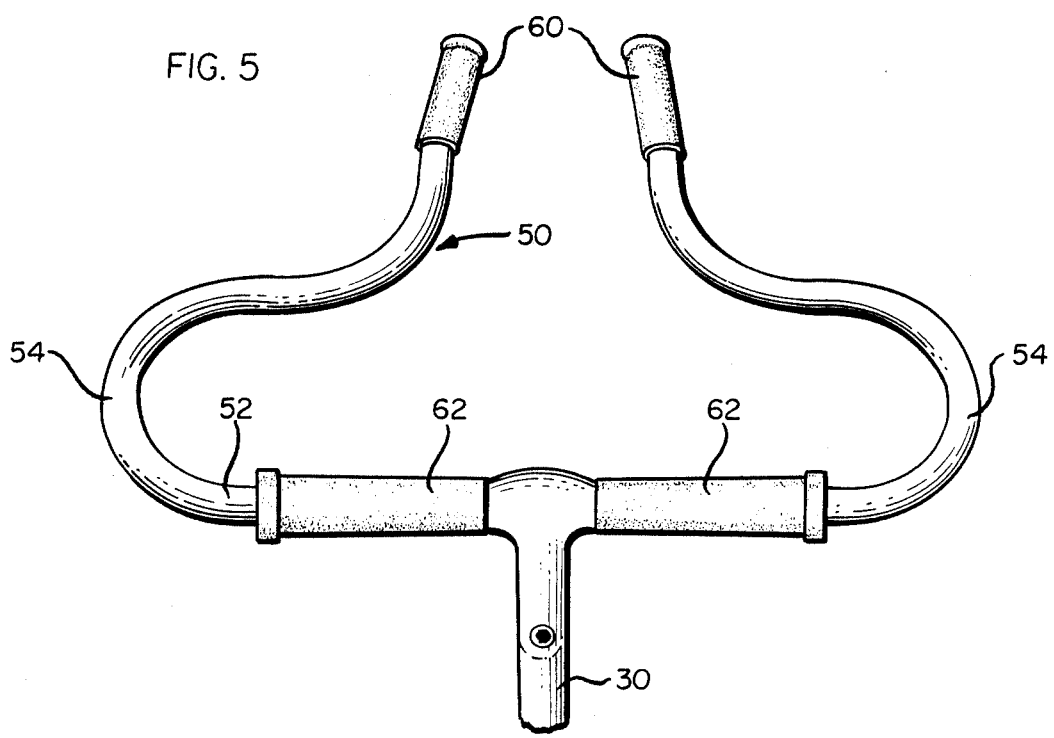
FIG. 5 is a developed fragmentary view of the bicycle handlebars as they appear from a position above and forward of the bicycle as suggested by line 5—5 in FIG. 1, portions of the associated bicycle being omitted for clarity.

A novel handlebar element 50 is shown in detail in FIGS. 2, 4 and 5. The handlebars 50 include a crosspiece 52 to which the stem 30 is connected by a stem clamp 51. Stem 30 may be raised or lowered relative to the head tube 28 by adjusting a stem bolt (not shown).

Extending from the crosspiece 52 are first handle portions 54 located and adapted to be grasped in a known manner by a rider. Brake-operating levers 56 extend from brake hoods 55 located upon the first handle portions 54.

In accordance with the invention, a small-frontal-area yet comfortable riding position is encouraged by providing novel second handle portions which extend forwardly of the other portions of the handlebar mechanism, as illustrated particularly in FIGS. 1-5. The second handles 60 are located so that, when they are grasped by a bicycle rider R, the rider's forearms F are located to be supported by the handlebars 50 at positions over the crosspiece 52. To this end, handlebar crosspieces can be provided with tapered padding material or other forearm rests 62, if desired. Together, then, the handlebars 50 and the position of the saddle 20 define a riding position in which the frontal area of the rider's silhouette is minimized, as especially suggested in FIG. 3. Furthermore, when the saddle and stem positions are properly adjusted, the rider's back will be substantially straight and horizontal to further reduce wind resistance and to enhance rider comfort.

Moreover, the width W of the rider's silhouette is minimized by positioning the rider's forearms or elbows so as to be relatively close together, as is especially suggested in FIGS. 2 and 4. To this end, the forearm padding elements 62 are each located rather closely adjacent the stem clamp 51. In this way, the maximum width W of the silhouette is simply that of the rider's shoulder width; his arms and elbows do not extend outside this profile. In this position, the rider's arms and elbows do not contribute to increased frontal area and consequently wind drag is reduced. To further reduce wind resistance, the second handles 60 are located relatively close to one another. It has been found useful to locate these handles approximately four inches or less apart.

The chord length from the crosspiece 52 to the tip of a handle 60 is preferably on the order of twelve inches. Under these circumstances, as particularly illustrated in FIG. 3, the rider naturally assumes the position in which his forearms and upper arms are located directly ahead of his torso. Because the rider's arms are located ahead of his lungs, breathing constrictions are minimized or eliminated.

A variety of different rider hand positions are provided by first handles 54. In addition to the position provided by handles 54 and second handle 60, the rider may wish to position his hands over the forearm rests 62, adjacent to the stem clamp 51, as is common during climbing. To this end, the forearm rests 62 are preferably cylindrical and have an outside diameter only slightly greater than that of the crosspiece 52. If desired, the brake handles 56 could be located more closely adjacent the second handle grips 60. Of course, additional brake handle or actuating mechanisms could also be installed adjacent the second handle grips 60.

As shown in FIGS. 6 and 6A, the handlebar elements 50 can be constructed of a single piece of tubing formed of aluminum or other suitable material. The preferred tubing is 6061-T6 aluminum tubing having an outside diameter of 24.0 millimeters and an inside diameter of 20.5 millimeters. To form the handlebars 50, straight piece of tubing 48 inches long is put through a series of eight bending operations. All of the bends have a radius of three inches.

Prior to bending, the midpoint M of the straight tube is identified and marks are placed at distances of 5, 10 and 15 inches from the midpoint in both directions (points A, B and C in FIG. 6). Then, a 180° bend away from the center is made on one side of the bar beginning at the five inch mark B. Next, a 90° bend away from the center and in the same plane as the first bend is made starting at the ten inch mark. Following this bend there is made a 15° bend away from the center, again in the same plane. To complete the bends on this side of the bar, a 30° upward bend is made commencing at the 15 inch mark C (see FIG. 6A which is a side view of the tubing shown in FIG. 6). These four bends are then repeated for the other side of the tubing. Lastly, the ends of the bars are cut such that the chord length from the center of the tube crosspiece to the tube tip (distance L in FIG. 6) is approximately twelve inches. This will provide a center-to-center tip width (distance T in FIG. 6) of approximately four inches. Dimensions L and T can, of course, be varied by changing the radius and/or starting points of the bends, but the dimensions given above are preferred for this embodiment of the invention.

Another embodiment of the invention is illustrated in FIGS. 7 and 7A. In this embodiment, a handlebar system having the advantages mentioned above is provided as an accessory for existing handlebars. As shown in FIG. 7, stem 30 is connected to conventional racing handlebars 81 at their crosspiece 82 by the stem clamp 51. Also connected to the crosspiece are add-on handlebars 80 which extend in a substantially horizontal plane away from the stem, i.e. away from the bicycle rider. The add-on handlebars 80 each includes a clamp element 84 and an extension element 86 and may also include grips 88 on the ends thereof.

A suitable clamp element, as shown in more detail in FIG. 7A, may consist of an upper portion 92 and a lower portion 94 which can be separated from upper portion 92. Upper portion 92 is threaded in at least two places on either side of a semi-spherical opening 96 in order to receive bolts 98. Located between the bolts 98 in the lower portion 94 is a second semi-spherical opening 97 which aligns with semi-spherical opening 96. The spherical opening formed by adjoining the two semi-spherical openings is adapted to securely grip crosspiece 82 when the bolts are tightened. A clamp, such as that shown in FIG. 7A, is preferable to, for example, a standard stem clamp since it allows the add-on handlebars 80 to be secured to the existing handlebars 81 without removing brake hoods 55.

While the add-on handlebars could extend outwardly from the crosspiece 82 at an angle exactly equal to 90°, it has been found more advantageous from both aerodynamic and comfort viewpoints to angle the bars inward toward one another such that the angle $\phi$ in FIG. 7 is equal to 75°. In addition, it is preferable to raise up the free end of each bar 45° on a radial bend of three inches. Thus, the end of each bar would appear as shown in FIG. 6A except that the 30° angle would be instead 45°. With such a 45° upward turn, the chord length from the end of an add-on bar to the center of the existing handlebars (dimension C in FIG. 7) should be in the range of nine to fourteen inches, and eleven inches for short model add-on bars and twelve inches for long model add-on bars is preferred. It is also desirable to space the clamps 84 so that the distance from the inside edge of one clamp to the inside edge of the second clamp (distance S in FIG. 7) is 4.75 inches. Such a spacing will provide a center-to-center tip width (distance T in FIG. 7) of 3.25 inches. Such a tip width distance provides reduced wind resistance yet allows the rider to have effective steering control.

To increase rider comfort, forearm rest pads 90 are affixed to the crosspiece 82 on the outside of the clamps 84. As with the forearm rest 62 described above, the forearm rest 90 can be grasped by the rider so that he can steer the bicycle while in a climbing position, i.e. while having his hands on the crosspiece of the conventional handlebars. Forearm rest 90 is preferably comprised of a cylindrically-shaped foam piece which has been split so that it can be placed upon crosspiece 82 without requiring removal of the brake hoods 55.

Figure 8:
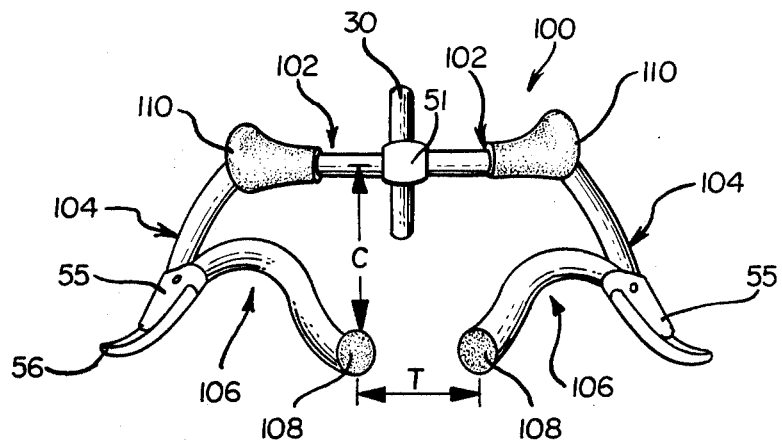
FIG. 8 is a front elevational view of a further embodiment of the handlebars of the present invention.
Figure 9:
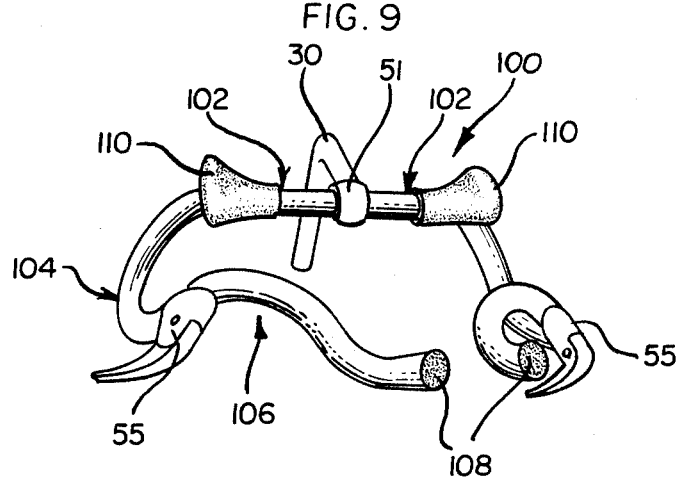
FIG. 9 is a front elevational view of the handlebars shown in FIG. 8 taken partially from the side.
Figure 10:
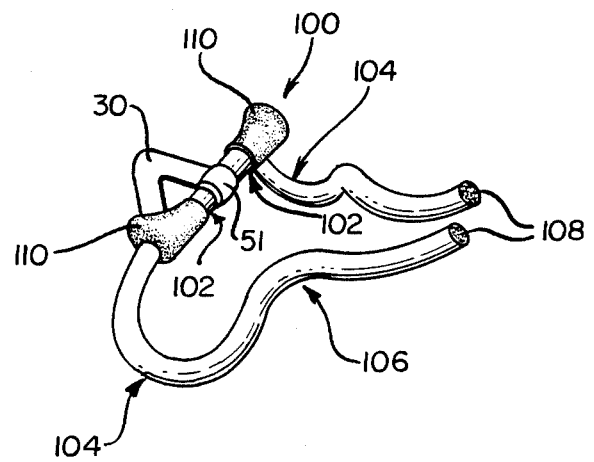
FIG. 10 is a side elevational view of the handlebars shown in FIG. 8 taken partially from the front.

FIGS. 8-10 illustrate a third embodiment of the handlebar system of the present invention. These handlebars again provide a riding position in which the rider's arms extend forward over the crosspiece. Yet these bars also provide the rider with sprinting or "on-the-drops" hand positions similar to those provided by conventional racing handlebars. The forwardly extending and sprinting positions, as well as various other positions, are provided by handlebars 100. The handlebars 100 include a crosspiece 102 to which the stem 30 is connected by stem clamp 51. Extending outwardly and downwardly from the crosspiece 102 are first handle portions 104 which include the sprinting portions. The handlebars then extend upward and inward to provide secondary handle portions 106. The handle portions 106 are located so that, when they are grasped by the rider, the rider's forearms are located to be supported by the handlebars 100 at positions over the crosspiece 102. The handlebars are further arranged such that the rider's hands are positioned closer and closer together as they approach the end 108 of the secondary handle portions 106. Inwardly tapered forearm rests 110 are positioned over the crosspiece 102 to increase the rider's comfort when using the secondary handle portions. Forearm rest 110 are again configured such that the rider can grasp over them to steer the bicycle in a climbing position.

The handlebars 100 are preferably formed from a single piece of 6061-T6 aluminum tubing which is at least 54 inches long. Prior to the bending operations, the center point of the tube is identified and distances of 3.25, 7.5, 16.25, 18.5 and 23 inches from the center point in both directions are marked off.

Figure 11A:
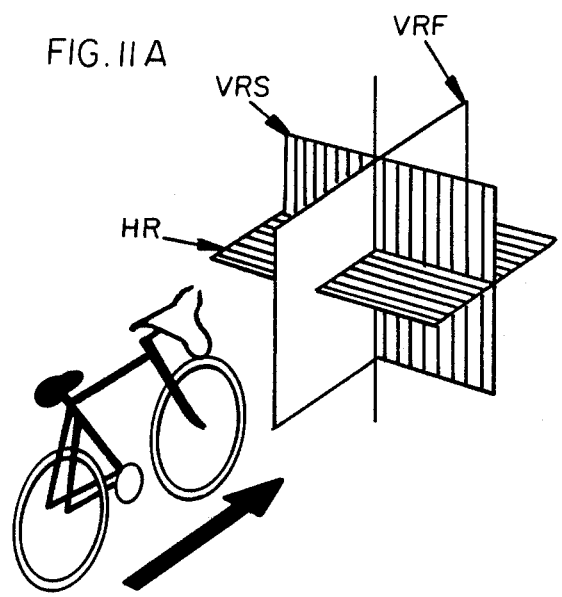
FIGS. 11A-T illustrate various views of the handlebars of FIG. 8 during the bending process which is used to manufacture the handlebars.

FIG. 11A illustrates the reference planes in which the bends described below are made. Plane HR is the horizontal reference plane; plane VRS is the vertical reference plane extending from side-to-side; and VRF is the vertical reference plane extending from front-to-back. The references made below to the right and left sides of the tubing are as seen from the rider's viewpoint, from the back of bicycle 10 looking forward. It should be noted that FIGS. 11B-11T, which illustrate the tubing bending steps, are not drawn to scale. All bends have a 2.5 inch radius.

Figure 11B:
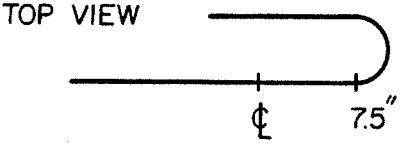
Figure 11C:
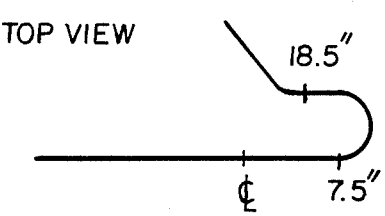
Figure 11D:
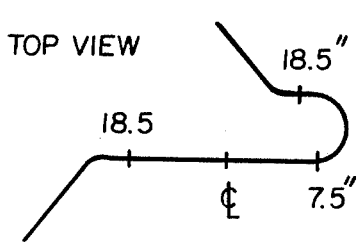
Figure 11E:
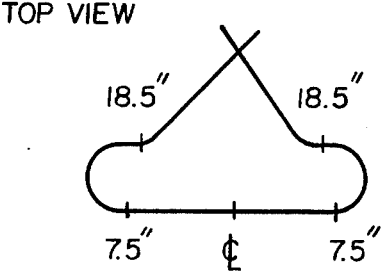

Referring first to FIG. 11B, which is a top view, i.e. a view looking down on the horizontal reference plane HR, a 180° bend away from the center is made on the right side of the tube beginning at the 7.5 inch mark. Next, a 60° bend is made on the right side of the tube beginning at the 18.5 inch mark (see FIG. 11C). Referring to FIG. 11D, a third bend of 60° is made on the left side of the tube commencing at the 18.5 inch mark. Next, a 180° bend is made on the left side of the tube commencing at the 7.5 inch mark (see FIG. 11E). All of the bends up to this point have been made in the horizontal reference plane only.

Figure 11F:
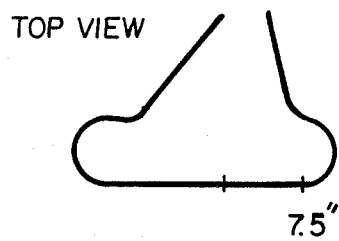
Figure 11G:
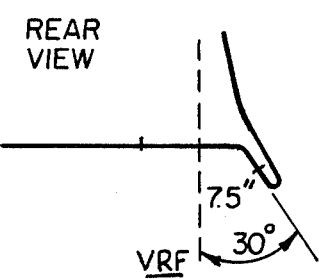
Figure 11H:
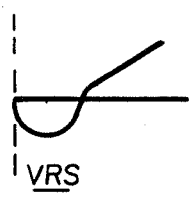
Figure 11I:
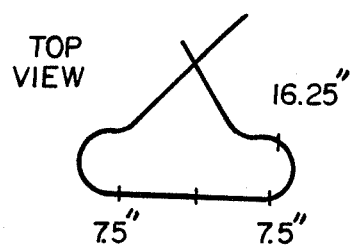
Figure 11J:
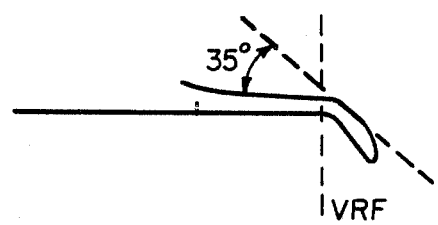
Figure 11K:
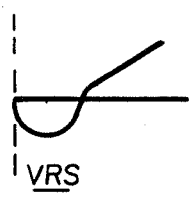
Figure 11L:
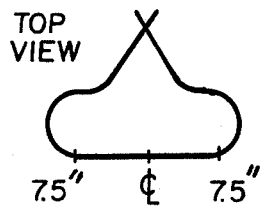
Figure 11M:
Figure 11N:

FIGS. 11F-11H illustrate the first bend made in the vertical reference plane from front-to-rear (VRF). This bend is a 60° bend made toward the center on the right side of the tube commencing at the 7.5 inch mark. It is important that this bend is maintained in the VRS plane 0° (see FIG. 11H). Next, a second VRF bend is made on the right side of the tube beginning at the 16.25 inch mark. This bend is a 35° bend in relation to this section's existing plane (see FIG. 11J). In the VRS plane, the tube is made parallel to the stem bar, i.e., 0° in this plane (see FIG. 11K). The 60° and 35° VRF plane bends just made of the right side of the tubing are then repeated on the left side (see FIGS. 11L-11N).

Figure 11O:
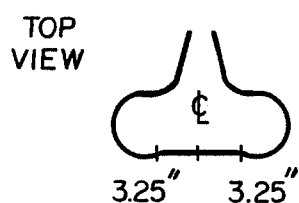
Figure 11P:
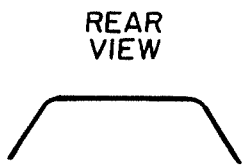
Figure 11Q:
Figure 11R:
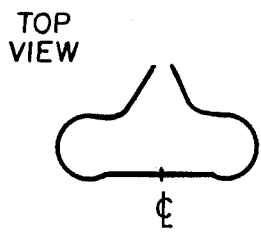
Figure 11S:
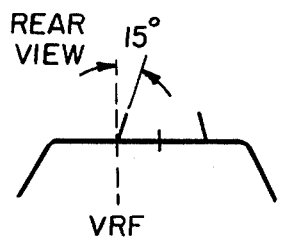
Figure 11T:
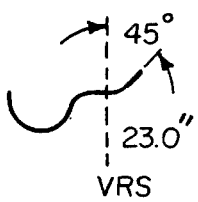

The next two bends are again made in the horizontal reference plane (HR). Both bends, one on the left side and one on the right side, are 10° and made toward the rear of the bicycle and commence at the 3.25 inch mark (see FIG. 11O). The next two bends are both started from the 23 inch mark. First a 45° upward bend (VRS) is made (see FIG. 11T). Then a 15° inward bend (VRF) is made (see FIG. 11S). These two bends are then repeated for the other side of the tube to complete the bending operations. Lastly, the ends of the tube are cut so that the chord length from the center of the crosspiece 102 to the closest edge of the bar end 108 (dimension C in FIG. 8) is eleven inches. With such a chord length, the center-to-center tip width (distance T in FIG. 8) is 3.25 inches.

Variations in the bending starting points and angles can, of course, be made to suit individual bicycle riders' preferences. In particular, it has been found that tall riders prefer a handlebar model in which dimension C in FIG. 6 is twelve inches rather than eleven inches. Even in the longer model handlebars, a 3.25 inch center-to-center tip width is desired for maximum rider comfort and steering control.

What is claimed is:

1. A bicycle handlebar connectable to a steering post located forwardly of a bicycle seat, comprising:
    a crosspiece having a central portion connectable with said steering post and sidewardly extending portions for supporting a rider's forearms,
    turned portions extending from said sidewardly extending portions including forwardly turned bends which extend forwardly while converging inwardly,
    a pair of forward handle portions extending from the forwardly turned and inwardly converging bends and being spaced relatively close together,
    said portions defining a plurality of rider positions one of which being the rider's forearms converging inwardly from the rider's shoulders and resting relatively close together on the sidewardly extending portions with the rider's hands being relatively close together while gripping the pair of forward handle portions.

2. The bicycle handlebar of claim 1 wherein the turned portions include downwardly inclined bends extending below the crosspiece followed by upwardly inclined bends which extend into the forwardly and inwardly turned bends to define additional rider positions.

3. The bicycle handlebar of claim 1 including a pair of pads extending circumferentially around the sidewardly extending portions to form a pair of forearm rests.

4. The bicycle handlebar of claim 3 wherein the pads each have an enlarged section which tapers inwardly to a smaller section with each of the smaller sections being located closely adjacent the central portion connectable to the steering post.

5. The bicycle handlebar of claim 1 wherein the pair of forward handle portions are spaced apart at their closest distance by a center to center separation width of approximately four inches or less.

6. The bicycle handlebar of claim 1 wherein the pair of forward handle portions are located forwardly of the crosspiece at their forward ends by a distance of approximately twelve inches.

7. The bicycle handlebar of claim 1 including a pair of hand brake mechanisms located on the turned portions and having brake levers extending adjacent the bends.

8. The bicycle handlebar of claim 1 wherein said pair of forward handle portions are also upwardly inclined to thereby define both inwardly and upwardly converging hand grips.

9. The bicycle handlebar of claim 1 wherein a single continuous piece of tubing forms said handlebar with the free ends of the tubing forming said pair of forward handle portions.

10. A bicycle handlebar connectable to a steering post located forwardly of a bicycle seat, comprising:
   a crosspiece having a central portion connectable with said steering post and opposite rest portions extending therefrom,
   a pair of turned portions extending from said opposite rest portions and extending generally forwardly and inwardly and including a pair of handle portions spaced apart a distance less than the width of the crosspiece, and
   a pair of inwardly tapered pads secured to said opposite rest portions of the crosspiece and having a taper urging a rider's forearms inwardly when the rider's hands extend forwardly to grip said pair of handle portions.

11. The bicycle handlebar of claim 10 wherein the pair of pads are configured to allow the rider to grasp over them so as to form additional hand positions for the rider.

12. The bicycle handlebar of claim 10 wherein the pair of pads are closely adjacent the central portion of the crosspiece to define a rider position with the rider's elbows being spaced apart a distance less than the rider's shoulder width when the rider's forearms are resting on said pads.

13. The bicycle handlebar of claim 12 wherein the pair of handle portions converge inwardly and are spaced relatively close together to allow the rider's arms when resting on said pads to extend relatively straight forward towards the handle portions.

14. The bicycle handlebar of claim 10 wherein the pair of turned portions each include a downwardly inclined bend followed by an upwardly inclined bend followed by forward and inwardly turned bends which extend into the handle portions, said downwardly inclined and upwardly inclined bends being located below the plane of the crosspiece and forming additional hand positions for the rider.

15. A bicycle comprising a frame, a rear wheel journaled to the frame, a bicycle seat extending above the frame, a steering post journaled to the frame forward of the bicycle seat, a fork attached to the steering post, a front wheel journaled to the fork, a crosspiece connected to the steering post and having opposite rest portions extending sideways therefrom, a pair of turned portions extending from the opposite rest portions and extending forwardly and inwardly to a pair of generally forwardly pointing handle portions spaced relatively close together, the bicycle seat and handle portions defining a rider position in which the rider's forearms are located adjacent the rest portions of the crosspiece and in front of the rider's shoulders.

16. The bicycle of claim 15 wherein the handle portions terminate in upwardly and inwardly converging grip ends whereby the rider's arms extend relatively straight forward between the rest portions and the grip ends.

17. The bicycle of claim 15 including a pair of inwardly tapered pads secured to the opposite rest portions with a taper urging the rider's forearms inwardly as the rider grips the pair of handle portions.

18. An adaptor kit for a bicycle having an original handlebar connected to a steering post, comprising:
   handlebar extension means for attachment to the original handlebar including a pair of clamps for engaging the original handlebar on opposite sides of the steering post, an extension element projecting forwardly from each clamp and away from the rider, each extension element having a hand grip portion located to define a rider position in which the rider's elbows are located near the original handlebar with the rider's arms extending forwardly toward the hand grip portions.

19. The adaptor kit of claim 18 wherein the extension elements are elongated and the length from the ends of the hand grip portions to the center of the original handlebar is in the range of nine to fourteen inches.

20. The adaptor kit of claim 18 wherein the hand grip portions each angle inwardly toward one another.

21. The adaptor kit of claim 20 wherein the hand grip portions each angle upwardly as well as inwardly.

22. The adaptor kit of claim 15 including a pair of rest pads for mounting to the original handlebar on each side of and adjacent the steering post for supporting the rider's forearms.

23. The adaptor kit of claim 22 wherein the pair of rest pads have a generally cylindrical shape with a split so that each rest pad can be mounted to the original handlebar without requiring removal of anything on the original handlebar.

24. An adaptor kit for a bicycle comprising: first and second handlebar extensions each having a corresponding clamp for fitting the corresponding extension onto a crosspiece of the bicycle handlebar so that said first and second extensions may project forward, toward free ends, said first and second extensions each include an upward incline at the free ends thereof with grips being mounted on said upward incline.

25. The adaptor of claim 24 further comprising crosspiece rest pads for mounting to said crosspiece adjacent to the coupling between said corresponding extension and said crosspiece.

* * * * *